United States Patent [19]

Laukhuf et al.

[11] Patent Number: 5,095,713
[45] Date of Patent: Mar. 17, 1992

[54] REFRIGERANT HANDLING SYSTEM AND METHOD WITH MULTIPLE REFRIGERANT CAPABILITY

[75] Inventors: Gregg E. Laukhuf, Bryan; Gary P. Murray, Montpelier, both of Ohio

[73] Assignee: Kent-Moore Corporation, Warren, Mich.

[21] Appl. No.: 643,339

[22] Filed: Jan. 22, 1991

[51] Int. Cl.$^5$ .............................. F25B 45/00
[52] U.S. Cl. .......................... 62/149; 62/77; 62/292
[58] Field of Search ............... 62/149, 174, 77, 292, 62/160, 506, 507, 509, 85, 115, 119, 196.4, DIG. 17

[56] References Cited

U.S. PATENT DOCUMENTS

| | | | |
|---|---|---|---|
| 4,441,330 | 4/1984 | Lower et al. | 62/149 |
| 4,476,688 | 10/1984 | Goddard | 62/149 |
| 4,768,347 | 9/1988 | Manz | 62/292 |
| 4,862,699 | 9/1989 | Lonnis | 62/149 X |
| 4,939,905 | 7/1990 | Manz | 62/149 X |

Primary Examiner—Harry B. Tanner
Attorney, Agent, or Firm—Barnes, Kisselle, Raisch, Choate, Whittemore & Hulbert

[57] ABSTRACT

A refrigerant handling system that includes a compressor and a condenser, each having an inlet and an outlet, with the condenser inlet normally being connected to the compressor outlet so that refrigerant in vapor phase from the compressor is at least partially condensed in the condenser. To clear liquid refrigerant from the condenser, the compressor outlet is disconnected from the condenser and connected to a refrigerant storage container, and the condenser outlet is connected to the compressor inlet. The compressor is then operated to draw refrigerant in vapor phase from the condenser, and to feed such refrigerant to the refrigerant storage container bypassing the condenser. A gauge is coupled to the compressor inlet so that compressor operation may be terminated by the operator when refrigerant vapor pressure in the condenser drops below a preselected threshold level. Thus, the condenser is cleared of refrigerant, which is now stored in the refrigerant storage container. The handling system may then be reconnected in the normal manner for recharging and operation in connection with a differing type of refrigerant without contaminating the latter.

14 Claims, 2 Drawing Sheets

REFRIGERANT HANDLING SYSTEM AND METHOD WITH MULTIPLE REFRIGERANT CAPABILITY

The present invention is directed to refrigerant handling systems of the type that employ a compressor for pumping refrigerant through the system and a condenser for at least partially condensing refrigerant from the compressor outlet, and more particularly to a system and method for selectively clearing liquid refrigerant from the condenser preparatory to employing the refrigerant handling system in conjunction with a differing type of refrigerant.

BACKGROUND AND OBJECTS OF THE INVENTION

U.S. Pat. No. 4,768,347, assigned to the assignee hereof, discloses a refrigerant recovery system that includes a compressor having an inlet coupled through an evaporator and through a solenoid valve to refrigeration equipment from which refrigerant is to be withdrawn, and an outlet coupled through a condenser to a refrigerant storage container or tank. The refrigerant storage container is carried by a scale having a limit switch coupled to control electronics to prevent or terminate further refrigerant recovery when the container is full. The scale comprises a platform pivotally mounted by a hinge pin to a wheeled cart, which also carries the evaporator/condenser unit, compressor, control electronics, and associated valves and hoses.

There is a need for refrigerant handling equipment, including refrigerant recovery equipment of the type disclosed in the above-noted U.S. Patent, that can handle differing types of refrigerants, such as R12, R22 and R502. A problem that is encountered lies in the fact that, following operation of the refrigerant recovery equipment, a significant amount of liquid refrigerant remains in the system. This refrigerant, which normally is located in the condenser, is sufficient to contaminant the next type of refrigerant to be recovered. It is therefore necessary to provide some mechanism for removing this refrigerant so as not to contaminate refrigerant subsequently recovered by the system.

U.S. Pat. No. 4,939,905, also assigned to the assignee hereof, discloses such a system, including a multiple-section condenser, and means responsive to refrigerant temperature and pressure at the outlet of the evaporator for automatically and selectively controlling flow of refrigerant from the compressor outlet to the individual condenser sections. Although this system is functional and efficient, it involves the expense of a multiple-section condenser, and is not as readily amenable as desired to retrofit in recovery equipment currently in the field.

It is therefore a general object of the present invention to provide a refrigerant handling system and method, particularly a refrigerant recovery system and method, that accommodate use in connection with multiple refrigerants of differing types while reducing or eliminating the possibility of refrigerant contamination through intermixing, that may be readily and economically implemented at the time of system manufacture or in equipment currently in the field, and that may be readily operated by relatively unskilled personnel.

SUMMARY OF THE INVENTION

A refrigerant handling system in accordance with the present invention includes a compressor and a condenser, each having an inlet and an outlet, with the condenser inlet normally being connected to the compressor outlet so that refrigerant in vapor phase from the compressor is at least partially condensed in the condenser. To clear liquid refrigerant from the condenser, the compressor outlet is disconnected from the condenser and connected to a refrigerant storage container, and the condenser outlet is connected to the compressor inlet. The compressor is then operated to draw refrigerant in vapor phase from the condenser, and to feed such refrigerant to the refrigerant storage container bypassing the condenser. A gauge is coupled to the compressor inlet so that compressor operation may be terminated by the operator when refrigerant vapor pressure in the condenser drops below a preselected threshold level. Thus, the condenser is cleared of refrigerant, which is now stored in the refrigerant storage container. The handling system may then be reconnected in the normal manner for recharging and operation in connection with a differing type of refrigerant without contaminating the latter.

The preferred implementation of the present invention takes the form of a refrigerant recovery system that includes a refrigerant compressor having an inlet normally connected to a refrigeration system from which refrigerant is to be recovered, and an outlet normally connected through a condenser to a liquid refrigerant storage container. The compressor is operated during a recovery mode of operation for drawing refrigerant from the refrigeration system connected to the compressor inlet, and feeding such refrigerant through the condenser t the refrigerant storage container. To clear the condenser preparatory use of the recovery system in conjunction with refrigerant of a differing type, the compressor outlet is disconnected from the condenser and connected directly to the storage container bypassing the condenser, and the condenser outlet is disconnected from the container and connected to the compressor inlet. The compressor is then operated in a clearing mode of operation to draw refrigerant in vapor phase from the condenser and feed such refrigerant to the storage container. In the preferred embodiment of the invention, refrigerant valves are connected to the condenser inlet and outlet for implementing the selective connection and disconnection previously described.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
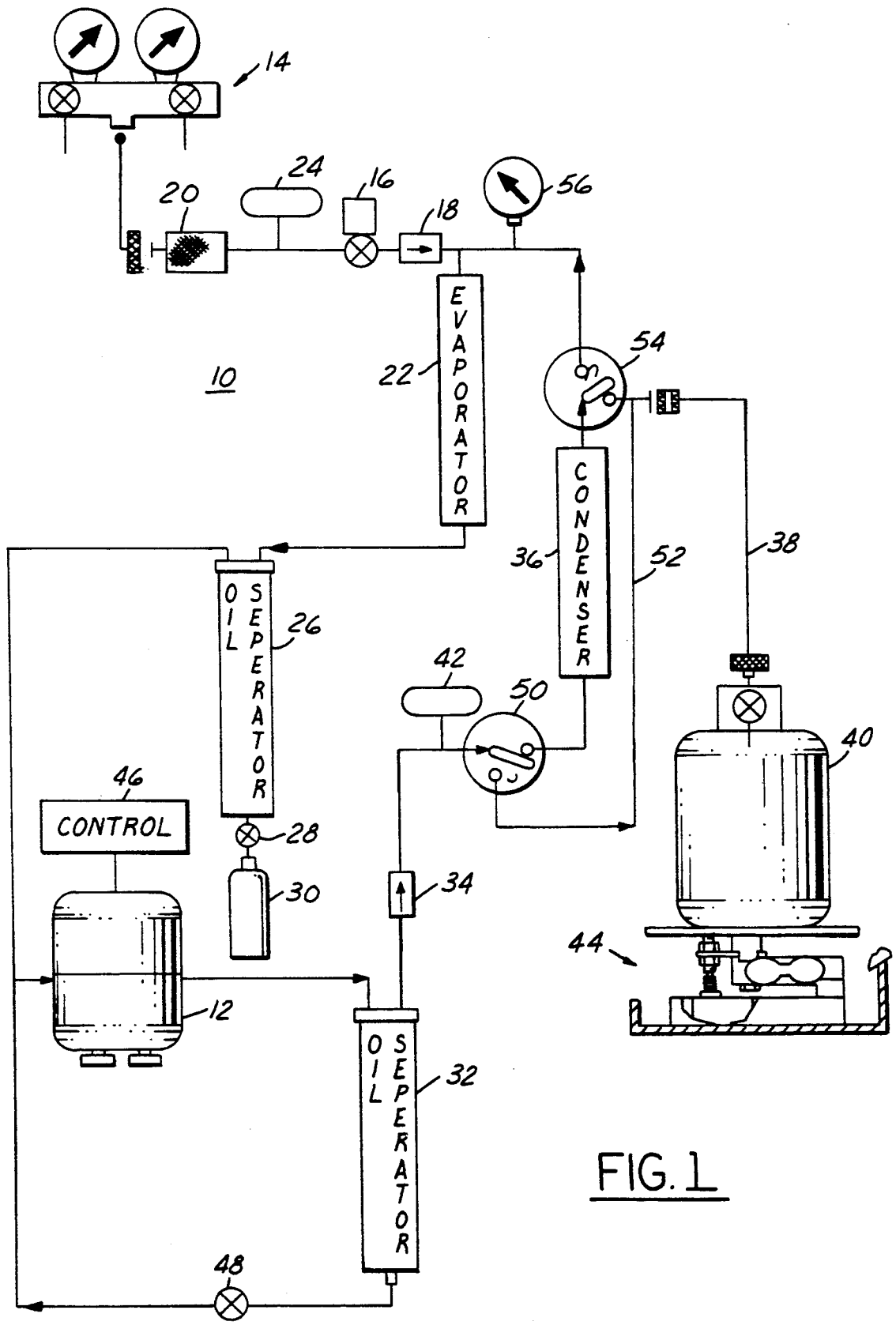
FIG. 1 is a schematic diagram of a refrigerant recovery system in accordance with one presently preferred embodiment of the invention.

FIG. 1 illustrates a refrigerant recovery system 10 that includes a compressor 12 having an inlet that is coupled to an input manifold 14 through a solenoid valve 16, a check valve 18, a filter 20 and an evaporator 22. A pressure switch 24 is connected between solenoid valve 16 and manifold 14, and is responsive to a predetermined low pressure to the compressor inlet from the refrigeration system to indicate removal or recovery of refrigerant therefrom. An oil separator 26 is connected between evaporator 22 and the inlet of compressor 12 for removing oil from inlet refrigerant vapor, and a valve 28 is coupled to separator 26 for draining oil removed from refrigerant into a catch bottle 30.

The outlet of compressor 12 is connected through a compressor oil separator 32 and a check valve 34 to the inlet of a condenser 36. The outlet of condenser 36 is connected through a hose 38, with associated quick-disconnect couplings, to the vapor inlet port of a liquid refrigerant storage container 40. A pressure sensor 42 is connected between oil separator 32 and condenser 36 for sensing a high-pressure condition within container 40. Container 40 rests upon a scale 44 that provides an electronic signal indicative of weight of refrigerant in the container. Compressor 12 is operated by control electronics 46 (which is also coupled to pressure sensors 24, 42, solenoid valve 16 and scale 44). A valve 48 connects the oil drain port of separator 32 to the inlet of compressor 12.

To the extent thus far described, refrigerant recovery system 10 is essentially similar to those disclosed in above-noted U.S. Pat. Nos. 4,768,347 and 4,939,905. In general, with manifold 14 connected to a refrigeration system from which refrigerant is to be recovered, solenoid valve 16 is open and compressor 12 is operated to draw refrigerant from the refrigeration system and to feed such refrigerant to storage container 40. When all refrigerant has been so recovered, control 46 is operated by pressure sensor 24 to close solenoid valve 16, and to terminate operation of compressor 12 either at the same time or after a delay suitable for pumping any refrigerant remaining in the system at least to condenser 36. If system 10 is then to be operated for recovering refrigerant of a differing type and storing recovered refrigerant in a different container 40, the problem is encountered in removing the refrigerant from condenser 36 so that such refrigerant will not contaminate the new refrigerant as the latter is recovered or escape to the atmosphere.

Apparatus for clearing such previously-recovered refrigerant from condenser 36, in accordance with the embodiment of the invention illustrated in FIG. 1, includes a three-way refrigerant valve 50 connected between pressure sensor 42 and the inlet of condenser 36. Valve 50 has at least two alternately selectable flow paths, one of which feeds refrigerant from check valve 34 to condenser 36 as previously described. The other flow path of valve 50 connects the outlet of compressor 12 through a refrigerant line 52 to the connection for line 38 bypassing condenser 36. A second three-way refrigerant valve 54 has at least two refrigerant flow paths, one of which connects the outlet of condenser 36 to container 40 through line 38 as previously described, and the other of which connects the condenser outlet to the inlet of evaporator 22. A pressure gauge 56 is connected between valve 54 and evaporator 22 for sensing vapor pressure of refrigerant drawn from condenser 36 through valve 54.

With valves 50, 54 positioned to conduct refrigerant in the manner shown in solid lines in FIG. 1, system 10 operates as previously described to recovery refrigerant from the refrigeration system connected to manifold 14, and to feed such refrigerant to storage container 40. To clear condenser 36 following such recovery operation and preparatory to use of system 10 in connecter with a differing type of refrigerant, valve 50 is switched to the position shown in phantom lines, so as to connect the outlet of compressor 12 to storage container 40, through lines 52, 38, bypassing condenser 36. Valve 54 is likewise switched from the position shown in solid lines to that shown in phantom so as to disconnect the outlet of condenser 36 from line 38 to container 40, and to connect the condenser outlet to the evaporator inlet. Compressor 12 is then operated by control 56 so as to draw refrigerant from condenser 36, and to pump such refrigerant directly into storage container 40. When the pressure of refrigerant in condenser 36 drops below a preselective threshold level at gauge 56, indicating that all refrigerant has been cleared from the condenser, control 46 terminates operation of compressor 12. Valves 50, 54 are then return to their normal or recovery positions illustrated in solid lines.

Figure 2:
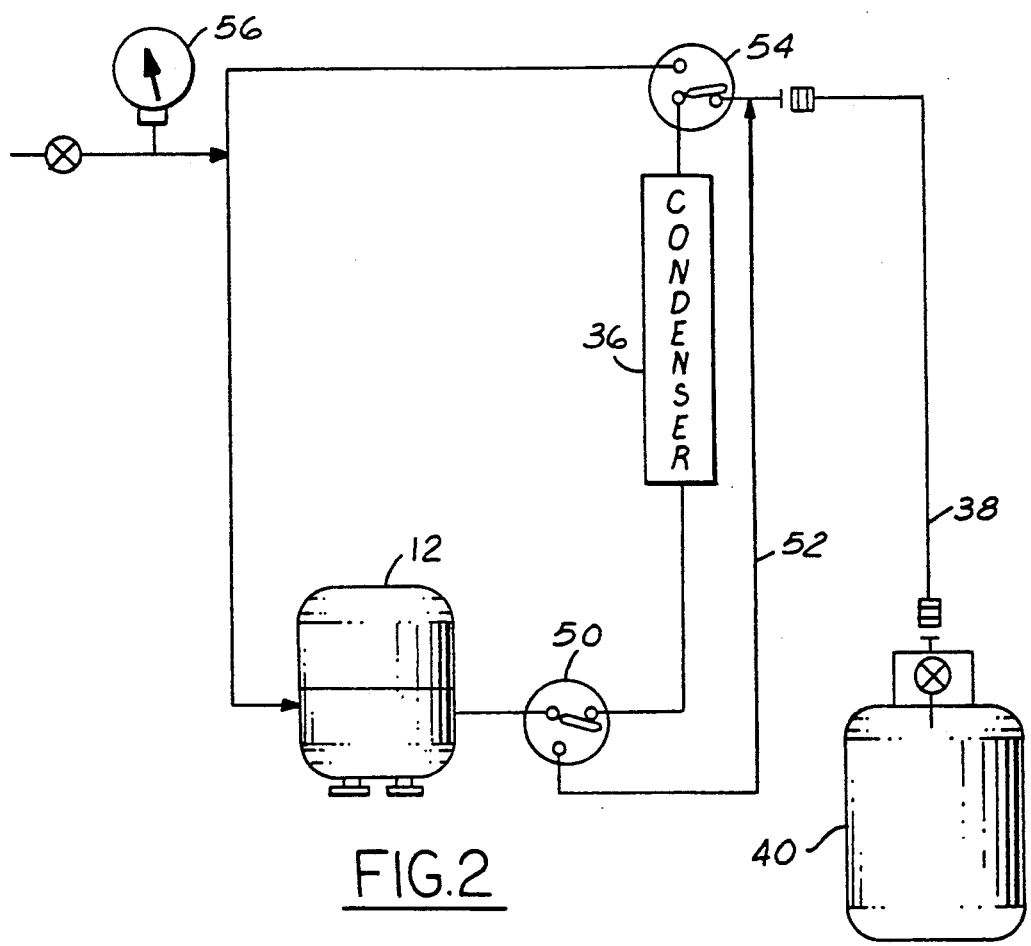
FIGS. 2 and 3 are fragmentary schematic diagrams that illustrate respected modified embodiments of the invention.

FIG. 2 illustrates a modified embodiment of the invention in which valve 54 connects condenser 36 directly to the inlet of compressor 12, rather then through evaporator 22 in FIG. 1. Valve 54 is connected to condenser 36 in such away as to ensure that that vapor rather than liquid refrigerant is pulled from the condenser to the compressor inlet.

Figure 3:
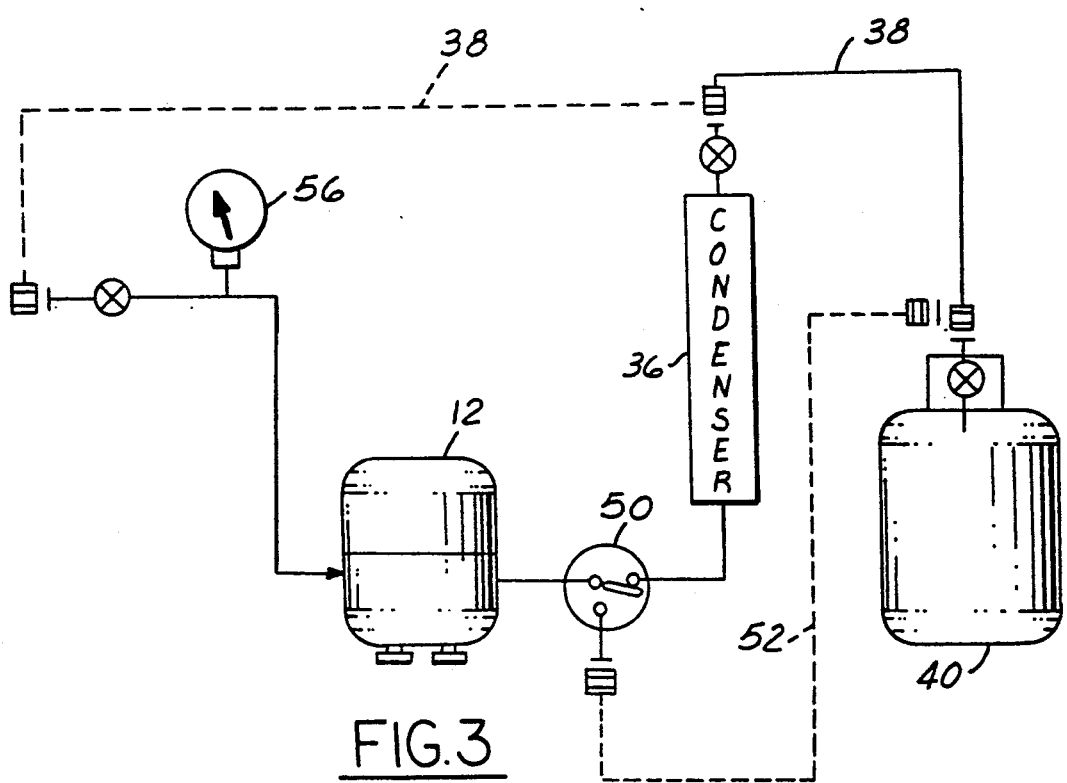

FIG. 3 illustrates a second modified embodiment of the invention in which valve 54 (FIGS. 1 and 2) at the outlet side of condenser 36 is eliminated, and in which condenser 36 is selectively connected either to storage container 40, or to the inlet of compressor 12, by means of operator manipulation of connecting hose 38. That is, for normal refrigerant recovery, hose 38 is connected to container 12, as illustrated in solid lines in FIG. 3, and the compressor inlet is connected to manifold 14 (FIG. 1). For clearing of condenser 36, hose 38 is disconnected from container 40 and connected to the inlet of compressor 12 as shown in phantom in FIG. 3. Hose 52 is connected directly to the container vapor port as shown in phantom in FIG. 3 for feeding refrigerant thereto from compressor 12 and valve 50, thereby bypassing condenser 36 during the condenser clearing mode of operation.

The principles of the present invention may be implemented employing manual valves and manual operation of compressor control 46 during the condenser clearing mode of operation. Alternatively, valves 50, 54 may comprise electronically controlled three-way valves responsive to operator activation of a "clear" button at control 46 for automatically switching to the condenser-clearing positions shown in phantom. In this connection, gauge 56 may be replaced by a pressure sensor connected to control 46 for automatically terminating the clearing mode of operation when all refrigerant has been recovered from the condenser. Likewise, following either manual or automatic termination of the condenser-clearing operation, the electronically controlled valves 50, 54 may be automatically returned their normal or recovery positions preparatory to a subsequent refrigerant recovery mode of operation.

We claim:

1. In a refrigerant handling system that includes a compressor and condenser means each having an inlet and an outlet, and means connecting said compressor outlet to said inlet of said condenser means so that refrigerant vapor from said compressor is at least partially condensed in said condenser means, means for clearing liquid refrigerant from said condenser means comprising:

first means for selectively disconnecting said compressor outlet from said inlet of said condenser means and connecting said compressor outlet to refrigerant storage means, and second means for connecting said outlet of said condenser means to said compressor inlet, such that operation of said compressor draws refrigerant from said condenser and feeds such refrigerant to said storage means.

2. The system set forth in claim 1 wherein said first means comprises first refrigerant valve means having a first refrigerant path from said compressor outlet to said inlet of said condenser means and a second refrigerant path from said compressor outlet to the storage means, and means for selecting between said first and second flow paths.

3. The system set forth in claim 2 wherein said second means comprises second refrigerant valve means having a first refrigerant flow path from said outlet of said condenser means to the storage means and a second refrigerant flow path from said outlet of said condenser means to said compressor inlet, and means for selecting between said first and second paths.

4. The system set forth in claim 1 further comprising means coupled to said second means for indicating refrigerant pressure in said condenser means when said outlet of said condenser means is connected to said compressor inlet by said second means.

5. A refrigerant recovery system that includes a refrigerant compressor having an inlet and an outlet, means for connecting said compressor inlet to a refrigeration system from which refrigerant is to be removed, means for connecting said compressor outlet to a refrigerant storage container, means for operating said compressor during a recovery mode of operation for drawing refrigerant from a refrigeration system connected to said compressor inlet and feeding such refrigerant through said compressor outlet-connecting means to a refrigerant storage container connected to said outlet of said compressor, and means for clearing refrigerant from said compressor outlet-connecting means following termination of said recovery mode of operation comprising:

first means for selectively disconnecting said compressor outlet from said compressor outlet-connecting means and connecting said compressor outlet to the refrigerant storage container, second means for selectively disconnecting said compressor outlet-connecting means from the storage container and connecting said outlet-connecting means to said compressor inlet, and means for operating said compressor in a clearing mode of operation to draw refrigerant from said outlet-connecting means through said second means and feed said refrigerant to the storage container through said first means bypassing said outlet-connecting means.

6. The system set forth in claim 5 wherein said first means comprises first refrigerant valve means having a first refrigerant flow path from said compressor outlet to said outlet-connecting means and a second refrigerant path from said compressor outlet to the storage means, and means for selecting between said first and second flow paths.

7. The system set forth in claim 6 wherein said second means comprises second refrigerant valve means having a first refrigerant flow path from said outlet of said outlet-connecting means to the storage means and a second refrigerant flow path from said outlet-connecting means to said compressor inlet, and means for selecting between said first and second paths.

8. The system set forth in claim 5 wherein said second means comprises second refrigerant valve means having a first refrigerant flow path from said outlet-connecting means to the storage container and a second refrigerant flow path from said outlet-connecting means to said compressor inlet, and means for selecting between said first and second paths.

9. The system set forth in claim 5 wherein said outlet-connecting means comprises a refrigerant condenser.

10. The system set forth in claim 9 further comprising means coupled to said second means for indicating refrigerant pressure in said condenser means when said when said outlet of said condenser means is connected to said compressor inlet by said second means.

11. A method of clearing refrigerant from the condenser of a refrigerant handling system that includes a compressor and condenser, each having an inlet and an outlet, with the condenser inlet normally being connected to the compressor outlet, said method comprising the steps of:

(a) disconnecting the compressor outlet from the condenser inlet and connecting the compressor outlet to refrigerant storage means, (b) connecting the condenser outlet to the compressor inlet, and (c) operating the compressor to draw off refrigerant from the condenser in vapor phase and feed such refrigerant to the storage means.

12. The method set forth in claim 11 comprising the additional step of:

(d) terminating operation of said step (c) when vapor pressure of refrigerant in said condenser drops below a predetermined level.

13. The method set forth in claim 12 wherein said step (d) is accomplished automatically.

14. The method set forth in claim 12 comprising the additional step, following said step (d), of (e) automatically reconnecting said compressor outlet to said compressor inlet and reconnecting said condenser outlet to said storage means.

* * * * *